(12) United States Patent
Yumii (10) Patent No.: US 10,202,008 B2
(45) Date of Patent: Feb. 12, 2019

(54) TIRE (71) Applicant: BRIDGESTONE CORPORATION, Tokyo (JP)

(72) Inventor: Keita Yumii, Tachikawa (JP)

(73) Assignee: BRIDGESTONE CORPORATION, Tokyo (JP)

(*) Notice: Subject to any disclaimer, the term of this patent is extended or adjusted under 35 U.S.C. 154(b) by 169 days.

(21) Appl. No.: 15/302,672

(22) PCT Filed: Mar. 27, 2015

(86) PCT No.: PCT/JP2015/059673
§ 371 (c)(1),
(2) Date: Oct. 7, 2016

(87) PCT Pub. No.: WO2015/156154
PCT Pub. Date: Oct. 15, 2015

(65) Prior Publication Data
US 2017/0028792 A1 Feb. 2, 2017

(30) Foreign Application Priority Data
Apr. 10, 2014 (JP) ................. 2014-081160

(51) Int. Cl.
*B60C 15/00* (2006.01)
*B60C 15/06* (2006.01)
(Continued)

(52) U.S. Cl.
CPC ............ *B60C 15/0628* (2013.01); *B60C 5/00* (2013.01); *B60C 15/06* (2013.01); *B60C 19/001* (2013.01);
(Continued)

(58) Field of Classification Search
CPC ...... B60C 15/00; B60C 15/06; B60C 15/0628; B60C 2015/0696; B60C 3/06
See application file for complete search history.

(56) References Cited

U.S. PATENT DOCUMENTS 3,044,523 A * 7/1962 Drakeford ............ B29D 30/48
152/541
4,155,394 A 5/1979 Shepherd et al.
2004/0211503 A1 10/2004 Matsumoto et al.

FOREIGN PATENT DOCUMENTS

CN 1511090 A 7/2004
DE 3720788 A1 1/1988
(Continued)

OTHER PUBLICATIONS

Machine translation of JP 5-124408, 1993.*
(Continued)

*Primary Examiner* — Justin R Fischer
(74) *Attorney, Agent, or Firm* — Oliff PLC (57) ABSTRACT This tire is provided with reinforcing cord layers that reinforce a bead part. The reinforcing cord layers are such that at the bead part at the inner side of vehicle mounting, the number of layers of the reinforcing cord layers with respect to a bead filler is greater at the inner side in the direction of tire width compared to the outer side in the direction of tire width with respect to the bead filler, and at the bead part at the outer side of vehicle mounting, the number of layers of the reinforcing cord layers with respect to the bead filler is greater at the outer side in the direction of tire width compared to the inner side in the direction of tire width with respect to the bead filler.

7 Claims, 3 Drawing Sheets

(51) Int. Cl.
*B60C 5/00* (2006.01)
*B60C 19/00* (2006.01)
*B60C 3/06* (2006.01)

(52) U.S. Cl.
CPC ........ *B60C 3/06* (2013.01); *B60C 2015/0696* (2013.01)

(56) References Cited

FOREIGN PATENT DOCUMENTS

| JP | S58-112602 U | | 8/1983 |
| JP | S64-30704 U | | 2/1989 |
| JP | 5-124408 | * | 5/1993 |
| JP | 2001-010313 A | | 1/2001 |
| JP | 2012-179944 A | | 9/2012 |
| JP | 2013-086771 A | | 5/2013 |

OTHER PUBLICATIONS

Jun. 16, 2015 International Search Report issued in International Patent Application No. PCT/JP2015/059673.
Mar. 3, 2017 Search Report issued in European Patent Application No. 15777197.3.
Apr. 25, 2017 Search Report issued in Chinese Patent Application No. 201580018835.2.

* cited by examiner

TIRE

TECHNICAL FIELD

The present invention relates to a tire having a reinforcing cord layer which reinforces a bead part.

BACKGROUND ART

Conventionally, in a tire mounted to a vehicle or the like, various methods to reinforce a bead part are adopted in order to improve operation stability. In Patent Literature 1, a tire in which an organic fiber reinforcing cord layer is arranged at an inner side of a bead filler forming a bead part in a tire width direction, and a metal reinforcing cord layer is arranged at an outer side of the bead filler in the tire width direction is disclosed. In the tire disclosed in Patent Literature 1, by reinforcing the head part by the metal reinforcing cord layer and the organic fiber reinforcing cord layer, rigidity in a lateral direction is enhanced, and therefore the operation stability is improved.

CITATION LIST

Patent Literature

Patent Literature 1: JP 2012-179944 A

SUMMARY OF INVENTION

Technical Problem

Furthermore, in recent years, reducing weight of the tire is required in view of environment performance. When two reinforcing cord layers of the metal reinforcing cord layer and the organic fiber reinforcing, cord layer are arranged such as the tire disclosed in Patent Literature 1, the weight of the tire is increased as a number of the reinforcing cord layers becomes larger. Thus, it may be impossible to enhance the environment performance sufficiently.

An object of the present invention is, in consideration of the problem described above, to provide a tire capable of reducing weight of the tire and improving operation stability in turning by enhancing rigidity of a bead part in a lateral direction.

Solution to Problem

To solve the above-mentioned problems, a tire (tire 1) according to an aspect of the present invention is a tire in which a mounting direction to a vehicle is designated, the tire includes a tread part (tread part 5) configured to be in contact with a road surface, a pair of bead parts (bead part 2) including a bead core (bead core 21) and a bead filler (bead filler 22), a carcass layer(carcass layer 3) folded around the bead core and extended toroidally between the pair of bead parts, and a reinforcing cord layer having a cord configured to reinforce the pair of bead part. In a vehicle inner side bead part, a number of layers in the reinforcing cord layer is larger on an inner side in a tire width direction with respect to the bead filler than on an outer side in the tire width direction with respect to the bead filler. In a vehicle outer side bead part, a number of layers in the reinforcing cord layer is larger on the outer side in the tire width direction with respect to the bead filler than on the inner side in the tire width direction with respect to the bead filler.

The vehicle inner side bead part may have the reinforcing cord layer only at the inner side in the tire width direction with respect to the head filler, and the vehicle outer side bead part may have the reinforcing cord layer only at the outer side in the tire width direction with respect to the bead filler.

An angle of the cord against a tire circumferential direction may be in a range of 20 degrees to 80 degrees.

A tire radial direction outer end part of the reinforcing cord layer may be arranged in a range of 20% to 50% of a tire sectional height from a bottom surface of the bead part toward the outer side in a tire radial direction.

A length in the fire radial direction of the reinforcing cord layer in the vehicle outer side bead part may be the same as a length in the tire radial direction of the reinforcing cord layer in the vehicle inner side bead part.

A length in the tire radial direction of the reinforcing cord layer in the vehicle outer side bead part may be longer than a length in the tire radial direction of the reinforcing cord layer in the vehicle inner side bead part.

The tire radial direction outer end part of the reinforcing cord layer in the vehicle outer side bead part may be arranged in a range of 20% to 50% of a tire sectional height from a bottom surface of the bead part toward the outer side in the tire radial direction, and the tire radial direction outer end part of the reinforcing cord layer in the vehicle inner side bead part may be arranged in a range of 15% to 40% of the tire sectional height from the bottom surface of the bead part toward the outer side in the tire radial direction.

A density of the cord in the reinforcing cord layer in the vehicle outer side bead part may be larger than a density of the cord in the reinforcing cord layer in the vehicle inner side bead part.

Advantageous Effects of Invention

The present invention provides a tire that can reduce weight of the tire and improve operation stability in turning by enhancing rigidity of a bead part in a lateral direction.

DESCRIPTION OF EMBODIMENTS

Figure 1:
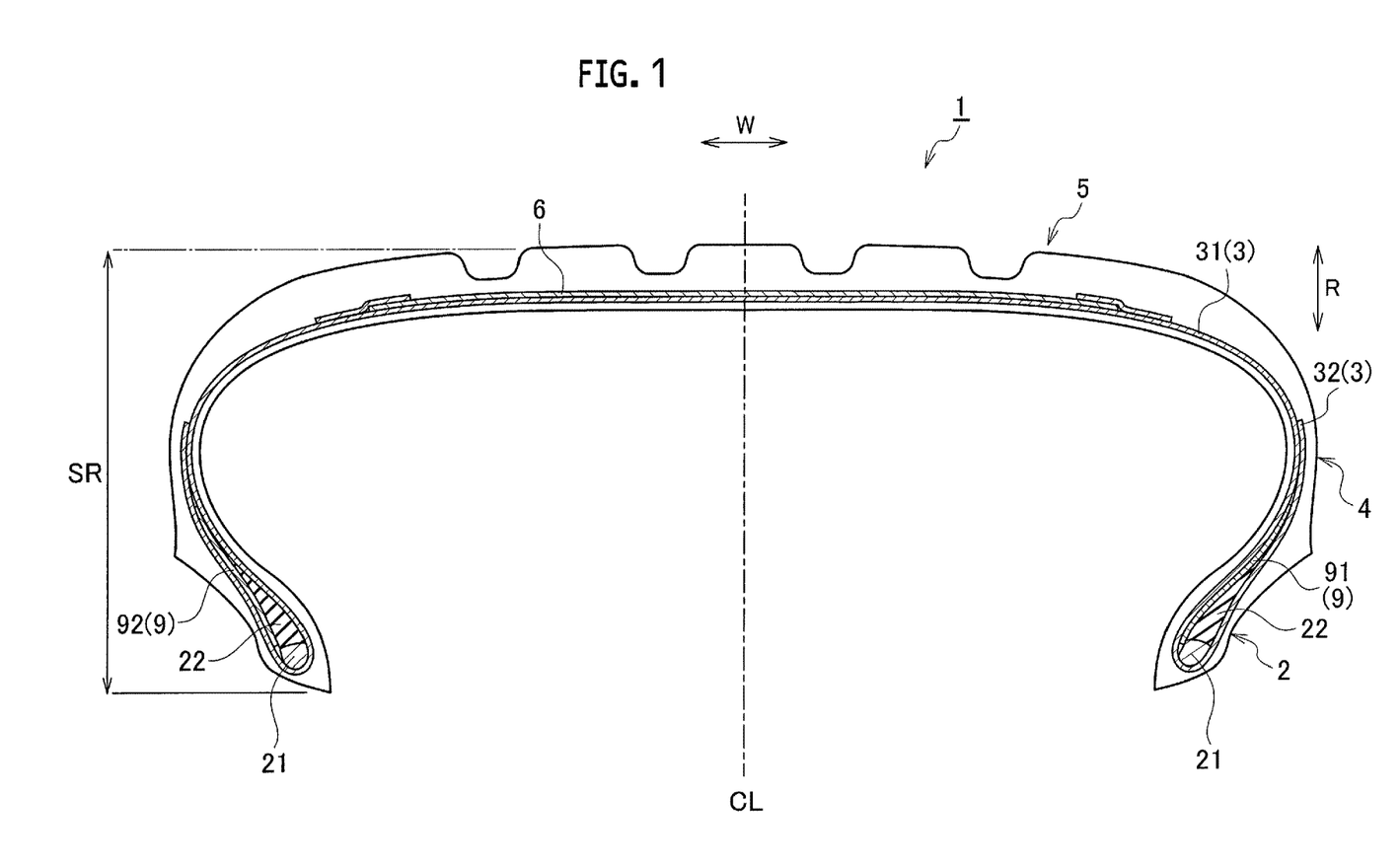
FIG. 1 is across-sectional view of a tire taken along a tire width direction orthogonal to a tire circumferential direction according to the present embodiment.

Hereinafter, a tire according to an embodiment of the present invention will be described with reference to the drawings. FIG. 1 is a cross-sectional view of a tire taken along a tire width direction orthogonal to a tire circumferential direction according to the present embodiment. Note that, in the following description of the drawings, same or similar reference signs denote same or similar elements and portions. It is to be noted that the drawings are schematic and the dimensions or ratios are different from actual values. Accordingly, specific dimensions and the like should be determined by taking the following description into consideration. Needless to say, a relationship or a ratio of mutual dimensions may differ among the drawings.

A tire 1 according to the present embodiment is mainly used for a vehicle. A tire for a vehicle is not limited to specific usage, namely the tire 1 may be used for a summer tire, an all seasons tire or a winter tire. Furthermore, the tire 1 may be also used for a special tire such as a side reinforcing type run flat tire having a crescent-shaped reinforcing rubber layer on a sidewall part 4, a stud tire or a studless tire.

(1) Whole Configuration of the Tire

The tire 1 has a pair of bead parts 2, a carcass layer 3, the sidewall part 4, a tread part 5, a belt layer 6 and a reinforcing cord layer 9. The tire is formed such that a mounting direction to a vehicle is designated.

The tire 1 may have, for example, a sealant member on an inner surface of the tire for preventing an air leaking in case of a puncture. In the tire 1, a porous member may be arranged on the inner surface of the tire or electrostatic flocking treatment may be applied to the inner surface of the tire in order to reduce a cavity resonance sound.

The tire 1 may have an inner liner at a tire inner surface side of the carcass layer 3. The inner liner may be formed, for example, by a rubber layer mainly provided with butyl rubber or a film layer mainly provided with resin.

Each of the bead parts 2 has a bead core 21 and a bead filler 22. The bead part 2 is formed to contact with a rim at an inner side in a tire radial direction R.

Various structures in the tire 1 having a circular shape a polygonal shape or the like may be adopted to the bead core 21.

The carcass layer 3 is extended toroidally between the pair of the bead cores 21. The carcass layer 3 has a body ply 31 arranged between the bead cores 21, and a folded ply 32 folded on the bead part 2 toward an outer side in the tire radial direction.

Various configurations in the tire 1 including a conventional structure may be adopted to the carcass layer 3. The carcass layer 3 may have a radial structure or a bias structure.

Various structures in the tire 1 may be adopted to a carcass line of the carcass layer 3. For example, a carcass maximum width position in the tire radial direction may be closer to a side of the bead part 2 or a side of the tread part 5. For example, the carcass maximum width position may be arranged in a range of 50% to 90% in a tire height ratio from a bead bottom surface toward the outer side in the tire radial direction.

Various structures in the tire may be adopted to the carcass layer 3. A number of cords embedded is generally within a range of 10 threads/50 mm to 60 threads/50 mm, however it is not limited to this.

Various structures in the tire may be adopted to the carcass layer 3. For example, a folded edge of the carcass may be arranged at the inner side in the tire radial direction than a bead filler edge, or alternatively the folded edge of the carcass may be extended toward the outer side in the tire radial direction than the bead filler edge or the tire maximum width position, and in such a case the folded edge of the carcass may be extended toward the inner side in the tire width direction than a tire width direction edge of the belt layer. Furthermore, in a case in which a plurality of the carcass layers is arranged, positions of the folded edges of the carcasses in the tire radial direction may be different from each other. Furthermore, the folded ply 32 may be omitted, and a structure in which the carcass layer 3 is interposed between a plurality of bead core members or is wound around the bead core 21 may be adopted.

The carcass layer 3 generally has a structure in which the carcass layer 3 is continuously extended between the pair of the bead cores 21, however the carcass layer 3 may be formed by a pair of carcass pieces extended from the bead core 21 with a break near the tread.

The sidewall part 4 is connected to an outer side of the bead part 2 in the tire radial direction. The sidewall part 4 is extended between the bead part 2 and the tread part 5.

The tire maximum width position of the sidewall part 4 may be arranged in a range of 50% to 90% in the tire height ratio from the bead bottom surface toward the outer side in the tire radial direction.

For example, the sidewall part 4 may have a structure having a rim guard. For example, the sidewall part 4 is preferably formed as a tire for a vehicle and has a recess part contacted with a rim flange.

The tread part 5 has a ground contact surface which contacts with a road surface. A shape of the tread part 5 is preferably formed in a smooth shape OD the end part in the tire width direction.

For example, a tread pattern may be provided with a width direction groove extended in the tire width direction from a part adjacent to a tire equatorial plane CL toward a ground contact end. In this case, the tread pattern may not include a circumferential direction groove. The tread pattern mainly provided with such a lateral groove can show especially performance on snow effectively.

For example, the tread pattern may be mainly provided with a rib-like land part partitioned in the tire width direction by one or more circumferential direction grooves or by the circumferential groove and a tread end part. Here, the rib-like land part means a land part extended in the tire circumferential direction without a lateral groove crossing in the tire width direction, however the rib-like land part may have a sipe or a lateral groove ended in the rib-like land part.

For example, the tread pattern may be provided with a block land part partitioned by a circumferential direction groove and a width direction groove. Furthermore, for example, the tread pattern may be formed such that its rotation direction is designated.

The tread pattern may be formed by combining various asymmetrical patterns of a half part of the tire at a mounting inner side to a vehicle with respect to the tire equatorial plane CL and another half part of the tire at a mounting outer side to a vehicle with respect to the tire equatorial plane CL. For example, the difference in a negative ratio may be provided between the pattern of the half part of the tire at the mounting inner side to a vehicle with respect to the tire equatorial plane CL and the pattern of another half part of the tire at the mounting outer side to a vehicle with respect to the tire equatorial plane CL. Furthermore, for example, number, density, position, depth, and angle with respect to the circumferential direction groove, the width direction groove, or the sipe may be different between the pattern of the half part of the tire at the mounting inner side to a vehicle with respect to the tire equatorial plane CL and the pattern of another half part of the tire at the mounting outer side to a vehicle with respect to the tire equatorial plane CL.

As a center region is defined by a width of 50% of the tread width with respect to the tire equatorial plane CL as the center and a shoulder region is defined by an outer side of the center region in a tire width direction, various differences in the tread pattern may be provided between in the center region and in the shoulder region. For example, the negative ratio may be different between in the center region and in the shoulder region. Furthermore, for example, number, density, position, depth, and angle with respect to the circumferential direction groove, the width direction groove, or the sipe may be different between in the center region and in the shoulder region.

For example, formed rubber may be used for the tread rubber.

The tread rubber may be provided with a plurality of rubber layers different from each other in the tire radial direction. The rubbers having differences in loss tangent, modulus, rigidity, a glass transition temperature, or material may be used for the plurality of the rubber layers. Further a ratio in thickness of the plurality of the rubber layers in the tire radial direction may be changed in the tire width direction, and further the ratio in thickness of a rubber layer of a circumferential direction groove bottom part or the like may be different from that of a rubber layer around the circumferential direction groove bottom part. Furthermore, the rubber layers may be formed such that a ratio in length of the plurality of the rubber layers in the tire width direction is changed in the tire radial direction or the ratio in length of a rubber layer of a limited part such as a part adjacent to the circumferential groove bottom part, a part adjacent to a tread end part, a shoulder land part or a center land part is different from that of a rubber layer around the limited part.

The belt layer 6 is arranged at the inner side of the tread part 5 in the tire radial direction so as to reinforce the tread part 5. The belt layer 6 is formed by an organic fiber having high strength, and a plurality of the belt layer 6 is laminated along the tire circumferential direction.

For example, the belt layer 6 may be provided with an inclined belt layer having two layers of belt cords inclined with respect to the tire circumferential direction, and the belt cords are intersected with each other between the layers and have different sizes in the tire width direction. Furthermore, the belt layer 6 may be provided with the inclined belt layer having two layers of the belt cords intersected with each other between the layers and a circumferential direction cord layer that covers only an end part of the inclined belt layer. Furthermore, the belt layer 6 may be provided with the inclined belt layer having two layers of the belt cords intersected with each other between the layers and a circumferential cord layer that covers most part of the inclined belt layer so as to cross the tire equatorial plane CL. Furthermore, the belt layer 6 may be provided with the inclined belt layer having two layers of the belt cords intersected with each other between the layers, a circumferential cord layer which covers most part of the inclined belt layer so as to cross the tire equatorial plane CL, and a circumferential direction cord layer which covers only an end part of the inclined belt layer. Furthermore, the belt layer 6 may be formed so as not to have the circumferential direction cord layer.

In the inclined belt layer, a width of a maximum width inclined belt layer having the maximum width is preferably in a range of 90% to 115% of a tread width, more preferably in a range of 100% to 105% of the tread width.

The inclined belt layer is generally formed by a metal cord, especially a steel cord, however the inclined belt layer may be formed by an organic fiber cord. The steel cord is mainly formed by steel and may include a trace amount of carbon, magnesium, silicon, phosphorus, sulfur, copper, or chromium.

The belt cord of the inclined belt layer may be formed by a monofilament cord or a cord in which a plurality of filaments is misted. Various designs may be adopted in a twisting structure of the inclined belt layer, and various sectional structures, twisting pitches, twisting directions, or distances between the filaments adjacent to each other may be used. The inclined belt layer is not limited to a specific sectional structure, and by adopting a cord in which filaments formed of the different materials are twisted, various twisting structures snob as a single twisting, a layer twisting and a multiple twisting may be adopted.

An inclined angle of the belt cord of the inclined belt layer is preferably more than 10 degrees against the tire circumferential direction.

The circumferential direction cord layer may be formed by a wave-shaped cord in order to strengthen break strength. Similarly, in order to strengthen the break strength, the circumferential direction cord layer may be formed by a high elongation cord (for example, elongation in breaking is in a range of 4.5% to 5.5%).

Various materials may be adopted for the circumferential direction cord layer, as a representative example, rayon, nylon, polyethylene naphthalate (PEN), polyethylene terephthalate (PET), aramid, glass fiber, carbon fiber or steel may be adopted. In view of reducing weight, an organic fiber cord is more preferable.

The cord of the circumferential direction cord layer may be formed by a monofilament cord, a cord in which a plurality of filaments is twisted, or a hybrid cord in which filaments formed of different materials are twisted.

A number of cords embedded in the circumferential direction cord layer is generally within a range of 20 threads/50 mm to 60 threads/50 mm, however it is not limited to this.

The circumferential direction cord layer may have a distribution of rigidity, material, a number of layers, density of cords embedded or the like in the tire width direction. For example, the number of the layers is increased only in the end part in the tire width direction or only in the center part.

The circumferential direction cord layer may be formed wider or narrower than the inclined belt layer. For example, the circumferential direction cord layer may have a width in a range of 90% to 110% of the maximum width inclined belt layer that is the widest layer among the inclined belt layers.

The circumferential direction cord layer may be formed in a spiral laver, and this configuration is preferable in view of manufacturing.

The circumferential direction cord layer may be formed by a strip-like cord in which a plurality of core wires arranged parallel to each other in a certain plane is bundled by a wrapping wire so as to keep the parallel arrangement of the core wires.

The reinforcing cord layer 9 is formed to reinforce the bead part 2. The reinforcing cord layer 9 is extended along the bead filler 22 in the tire radial direction R. The reinforcing cord layer 9 is formed by a rubber layer or a cord layer covered with rubber. The reinforcing cord layer 9 is provided with a composition body of an organic fiber cord and rubber. Examples of the organic fiber cord include a twisted thread or a non-woven fabric provided with nylon, polyester, and/or aramid.

The reinforcing cord layer 9 according to the present embodiment has a plurality of organic fiber cords, The organic fiber cord is inclined against the tire circumferential direction. An inclined angle of the organic fiber cord against the tire circumferential direction is in a range of 20 degrees to 80 degrees.

The reinforcing cord layer 9 has an inner side reinforcing cord layer 91 arranged at an inner side in the tire width direction than the bead filler 22 arranged at the mounting inner side to a vehicle, and an outer side reinforcing cord layer 92 arranged at an outer side in the tire width direction than the bead filler 22 arrange at the mounting outer side to a vehicle. The inner side reinforcing cord layer 91 is arranged in the bead part 2 at the mounting inner side to a vehicle, and the outer side reinforcing cord layer 92 is arranged in the bead part 2 at the mounting outer side to a vehicle.

The inner side reinforcing cord layer 91 is arranged between the bead filler 22 and the body ply 31. The outer side reinforcing cord layer 92 is arranged between the bead filler 22 and the folded ply 32. A length of the outer side reinforcing cord layer 97 in the tire radial direction is the same as a length of the inner side reinforcing cord layer 91 in the tire radial direction. Furthermore, a height of a tire radial direction outer end part of the outer side reinforcing cord layer is the same as a height of a tire radial direction outer end part of the inner side reinforcing cord layer. Furthermore, the tire radial direction outer end part of the outer side reinforcing cord layer and the tire radial direction outer end part of the inner side reinforcing cord layer are arranged in a range of 15% to 50% of a tire sectional height from a bottom surface of the bead part 2 toward the outer side in the tire radial direction.

Furthermore, a tire sectional height SR is a length of the tire in the tire radial direction in a normal tire pressure and no load state, and in other words, the tire sectional height SR is a tire maximum height in the normal tire pressure and no load state. Here, the bead bottom surface is a bottom surface of a bead heel part arranged at a tire width direction outer side part in the bead bottom surface.

(2) Function and Effect

The reinforcing cord layer 9 is formed such that, in the bead part 2 at the mounting inner side to a vehicle, a number of layers of the reinforcing cord layer 9 at the inner side in the tire width direction with respect to the bead filler 22 is larger than a number of layers of the reinforcing cord layer 9 at the outer side in the tire width direction with respect to the bead filler 22, and in the bead part 2 at the mounting outer side to a vehicle, a number of layers of the reinforcing cord layer 9 at the outer side in the tire width direction with respect to the bead filler 22 is larger than a number of layers of the reinforcing cord layer 9 at the inner side in the tire width direction with respect to the bead filler 22. Thus, in the bead part 2 at the mounting inner side to a vehicle, a part at the inner side in the tire width direction than a neutral axis of bending of the bead part 2 is reinforced, and in the bead part 2 at the mounting outer side to a vehicle, a part at the outer side in the tire width direction than the neutral axis of bending of the bead part 2 is reinforced.

More specifically, the tire 1 according to the present embodiment has the inner side reinforcing cord layer 91 arranged at the inner side in the tire width direction than the bead filler 22 arranged at the mounting inner side to a vehicle, and the outer side reinforcing cord layer 92 arranged at the outer side in the tire width direction than the bead filler 22 arranged at the mounting outer side to a vehicle. Thus, in the mounting inner side to a vehicle, a part at the inner side in the tire width direction than the neutral axis of bending of the bead part 2 is reinforced, and in the mounting outer side to a vehicle, a part at the outer side in the tire width direction than the neutral axis of bending of the bead part 2 is reinforced.

The applicant arranged the reinforcing cord layer 9 at the inner side in the tire width direction with respect to the bead filler 22 and at the outer side in the tire width direction with respect to the bead filler 22 in bead part 2 at the mounting outer side to a vehicle and in the bead part 2 at the mounting inner side to a vehicle, respectively. Furthermore, the applicant studied as to which part of the reinforcing cord layer receives tension force in turning in which the bead part 2 is easily deformed. Furthermore, the study in turning is executed by using the tire 1 of the mounting outer side to a vehicle where lateral force is the largest.

As a result, it is found that, in the bead part 2 at the mounting inner side to a vehicle, the inner side reinforcing cord layer 91 arranged at the inner side in the tire width direction than the bead filler 22 receives the tension force much more than the reinforcing cord layer 9 arranged at the outer side in the tire width direction than the bead filler 22. Furthermore, it is found that, in the bead part 2 at the mounting outer side to a vehicle, the outer side reinforcing cord layer 92 arranged at the outer side in the tire width direction than the bead filler 22 receives the tension force much more than the reinforcing cord layer 9 arranged at the inner side in the tire width direction than the bead filler 22.

In the tire 1 according to the present embodiment, by arranging the inner side reinforcing cord layer 91 and the outer side reinforcing cord layer 92 at parts apt to receive the tension force in turning, the bead pan 2 at the mounting outer side to a vehicle can be reinforced effectively, and the bead part 2 at the mounting inner side to a vehicle can be reinforced effectively. Thus, the lateral direction rigidity of the bead part 2 is enhanced, and therefore the operation stability in turning is improved.

Furthermore, in the tire 1 according to the present embodiment, the bead part 2 at the mounting inner side to a vehicle has the reinforcing cord layer 91 only at the inner side in the tire width direction with respect to the head filler 22, and the bead part 2 at the mounting outer side to a vehicle has the reinforcing cord layer 92 only at the outer side in the tire width direction with respect to the bead filler 22. Since the inner side reinforcing cord layer 91 and the outer side reinforcing cord layer 92 are arranged only at the parts apt to receive the tension force in turning, in each of the bead parts 2 at the mounting outer side and the mounting inner side to a vehicle, a number of the reinforcing cord layers 9 can be reduced compared to a configuration in which the reinforcing cord layers 9 are arranged at the outer side in the width direction than the bead filler 22 and at the inner side in the width direction than the bead filler 22, and therefore reducing weight can be achieved. For example, if the number of the reinforcing cord layers 9 is increased, weight is increased and therefore a rolling resistance is deteriorated. By reducing the number of the reinforcing cord layers 9, the deterioration of the rolling resistance can be suppressed, and increasing in cost can be suppressed.

Furthermore, deformation of the bead part 2 at the mounting outer side to a vehicle with respect to the neutral axis and deformation of the bead part 2 at the mounting inner side to a vehicle with respect to the neutral axis are different from each other, and therefore the tire 1 is rotated in an asymmetrical deformation state. When the tire 1 is rotated in such a deformation state, force to return the tire 1 to an original state before deforming is generated. The force to return the tire 1 to the original state before deforming is applied in an inward direction, and therefore the operation stability in an initial steering is enhanced.

Furthermore, a length of the outer side reinforcing cord layer 92 in the tire radial direction and a length of the inner side reinforcing cord layer 91 in the tire radial direction are preferably the same length. In a configuration in which a length of the outer side reinforcing cord layer 92 in the tire radial direction and a length of the inner side reinforcing cord layer 91 in the tire radial direction are the same length, the tire radial direction outer end part of the reinforcing cord layer 9 is preferably arranged in a range of 15% to 50% of the tire sectional height SR from the bottom surface of the bead part 2 toward the outer side in the tire radial direction. Since the length of the outer side reinforcing cord layer 92 in the tire radial direction and the length of the inner side reinforcing cord layer 91 in the tire radial direction are the same length, manufacturing efficiency can be improved.

An angle of the organic fiber cord against the tire circumferential direction is in a range of 20 degrees to 80 degrees. By arranging the organic fiber cord at such an angle, the tensional rigidity in the tire radial direction is mainly enhanced, and therefore the operation stability in turning is improved. In addition, the reinforcing cord layer 9 having the organic fiber cord has larger tensional rigidity compared to a rubber layer formed of rubber. Thus, since the reinforcing cord layer 9 having the organic fiber cord is arranged, both of reducing weight and reinforcing the bead part 2 can be achieved.

(3) Modified Example

As described above, the present invention is disclosed through the embodiment according to the present invention, however the present invention is not limited to the description and the drawings forming a part of the present disclosure. Various modifications, examples, and operation techniques will be apparent from the present disclosure by a person skilled in the art.

In the embodiment described above, the inner side reinforcing cord layer 91 having one layer and the outer side reinforcing cord layer 92 having one layer are arranged, however it is not limited to such a configuration. As a modified example, the inner side reinforcing cord layer 91 having a plurality of layers and the outer side reinforcing cord layer 92 having a plurality of layers may be arranged. The reinforcing cord layer 9 of the tire according to the modified example is formed such that, in the bead part 2 at the mounting inner side to a vehicle, a number of layers of the reinforcing cord layer 9 is larger at the inner side in the tire width direction with respect to the bead filler 22 than at the outer side in the tire width direction with respect to the bead filler 22, and in the bead part 2 at the mounting outer side to a vehicle, a number of layers of the reinforcing cord layer 9 is larger at the outer side in the tire width direction with respect to the bead filler 22 than at the inner side in the tire width direction with respect to the head filler 22. With the tire 1 according to the modified example, reducing weight of the tire 1 can be achieved, and the operation stability in turning can be improved by enhancing the lateral direction rigidity of the bead part 2.

In the embodiment described above, the length in the tire radial direction, a number and density of the organic fiber cords are the same between in the inner side reinforcing cord layer 91 and in the outer side reinforcing cord layer 92, and therefore the rigidity thereof are the same. However, it is not limited to such a configuration. For example, the rigidity of the inner side reinforcing cord layer 91 and the rigidity of the outer side reinforcing cord layer 92 may be different.

Specifically, the length of the outer side reinforcing cord layer 92 in the tire radial direction may be longer than the length of the inner side reinforcing cord layer 91 in the tire radial direction. Furthermore, in a configuration in which the length of the outer side reinforcing cord layer 92 in the tire radial direction is longer than the length of the inner side reinforcing cord layer 91 in the tire radial direction, the tire radial direction outer end part of the outer side reinforcing cord layer 92 is preferably arranged in a range of 20% to 50% of the tire sectional height SR from the bottom surface of the bead part 2 toward the outer side in the tire radial direction, and the tire radial direction outer end part of the inner side reinforcing cord layer 91 is preferably arranged in a range of 15% to 40% of the tire sectional height SR from the bottom surface of the bead part 2 toward the outer side in the tire radial direction. Furthermore, in other configuration in which the rigidity of inner side reinforcing cord layer 91 and the rigidity of the outer side reinforcing cord layer 92 are different, the density of the organic fiber cord of the outer side reinforcing cord layer 92 may be larger than the density of the organic fiber cord of the inner side reinforcing cord layer 91.

Since the outer side reinforcing cord layer 92 is arranged at the outer side of the bead filler 22 in the tire width direction, the bead part 2 can be reinforced and durability of a side cut can be improved. Since the length of the outer side reinforcing cord layer 92 in the tire radial direction is to be longer than the length of the inner side reinforcing cord layer 91 in the tire radial direction, the durability of the side cut can be improved, and since the inner side reinforcing cord layer 91 is to be small, increasing weight of the tire 1 can be suppressed.

Furthermore, the reinforcing cord layer 9 according to the present embodiment is arranged between the carcass layer 3 and the bead filler 22, however the reinforcing cord layer 9 may be arranged at the outer side or inner side in the tire width direction than the carcass layer 3. Specifically, the outer side reinforcing cord layer 92 may be arranged at the outer side in the tire width direction than the folded ply 32. Furthermore, the inner side reinforcing cord layer 91 may be arranged at the inner side in the tire width direction than the body ply 31.

The tire radial direction inner end part of the reinforcing cord layer 9 may be arranged at the outer side, in the tire radial direction than the tire radial direction inner end part of the bead core 21, and may be arranged so as to cover the tire radial direction end part of the bead core 21 and be folded toward the outer side in the tire radial direction. The end part of reinforcing cord layer 9 folded toward the outer side in the tire radial direction is preferably arranged at the inner side in the tire radial direction than the bead filler 22 in order to suppress excessive increasing of weight.

The tire 1 according to the present embodiment can be preferably used for a tire for a vehicle, specifically for a tire for a vehicle with weight reduced. Example of the tire for the vehicle with weight reduced includes a tire tin which at least one of the following conditions is fulfilled. A tire 1 in which a carcass ply provided with a cord layer including an organic fiber cord and a number of layers of the carcass ply is one. A tire in which a height of the bead filler 22 is less than 30% of the tire sectional height SR. A tire 1 in which a minimum thickness of the sidewall part 4 is smaller than a radius of the bead core 21. A tire in which a height of the folded ply 32 is in a range of 20% to 50% of the tire sectional height SR.

(4) Example

Next, in order to check the effect of the present invention, a comparative evaluation between an example and comparative examples is executed. Firstly, cornering power and conicity component with respect to an arrangement of the reinforcing cord layer are evaluated.

The tires according to an example 1, and comparative examples 1 and 2 are formed as a radial tire for a vehicle having a tire size of 225/45 R18 and having only one layer of a radial ply including an organic fiber cord. The tire radial direction inner end part of the reinforcing cord layer is arranged at a position of 20% of the tire sectional height from the bottom surface of the bead part toward the outer side in the tire radial direction. The tire radial direction outer end part of the bead filler is arranged at a position of 27% of the tire sectional height from the bottom surface of the bead part toward the outer side in the tire radial direction. The minimum thickness of the sidewall part against the bead core radius is 60%. The tire radial direction outer end part of the folded ply is arranged at a position of 32% of the tire sectional height from the bottom surface of the head part toward the outer side in the tire radial direction. The rim width is 9J. Load is 250 kPa, and test condition is 6.08 kN. The angle of the organic fiber cord in the reinforcing cord layer against the tire circumferential direction is 45 degrees, and the sectional height of the reinforcing cord layer against the tire sectional height is 35%. Furthermore, the position of the tire radial direction outer end part of the bead filler, the minimum thickness of the sidewall part against the bead core radius, the position of the tire radial direction outer end part of the folded ply are the same in the mounting outer side to a vehicle and in the mounting inner side to a vehicle.

In the tire according to the comparative example 1, both of the inner side reinforcing cord layer and the outer side reinforcing cord layer are arranged at the inner side of in the tire width direction than the bead filler. In the tire according to the comparative example 2, both of the inner side reinforcing cord layer and the outer side reinforcing cord layer are arranged at the outer side in the tire width direction than the bead filler. In the tire according to the example 1, the inner side reinforcing cord layer is arranged at the inner side in the tire width direction than the bead filler, and the outer side reinforcing cord layer is arranged at the outer side in the tire width direction than the bead filler.

An increasing rate of the cornering power of the tires according to the comparative examples 1 and 2, and the example 1 against a tire without the reinforcing cord layer, and an increasing rate of the conicity component in a slipping angle of 0 degree of the tires according to the comparative examples 1 and 2, and the example 1 against the tire without the reinforcing cord layer are measured. The measurement result is shown in Table 1.

TABLE 1

|  | Cornering Power | Conicity Component |
|---|---|---|
| Comparative Example 1 | 0.15% | 104% |
| Comparative Example 2 | 0.35% | 103% |
| Example 1 | 0.90% | 118% |

According to the measurement result shown in the Table 1, it is found that, with a configuration in which the inner side reinforcing cord layer is arranged at the inner side in the tire width direction than the bead filler, and the outer side reinforcing cord layer is arranged at the outer side in the tire width direction than the bead filler, the cornering power and the conicity component can be extremely increased. Furthermore, it is found that, by increasing the conicity component, the initial steering is improved.

Secondly, the cornering power with respect to the angle of the organic fiber cord forming the reinforcing cord layer is evaluated. The tire according to the second evaluation is the same as the tire according to the first evaluation described above, and the test condition or the like of the second evaluation is similar to that of the first evaluation. An increasing rate of the corner power of the tire when the angle of the organic fiber cord against the tire circumferential direction is changed between 0 degree and 90 degrees is measured, as the reference is defined by the cornering power of a tire in which the angle of the organic fiber cord against the tire circumferential direction is 0 degree.

Figure 2:
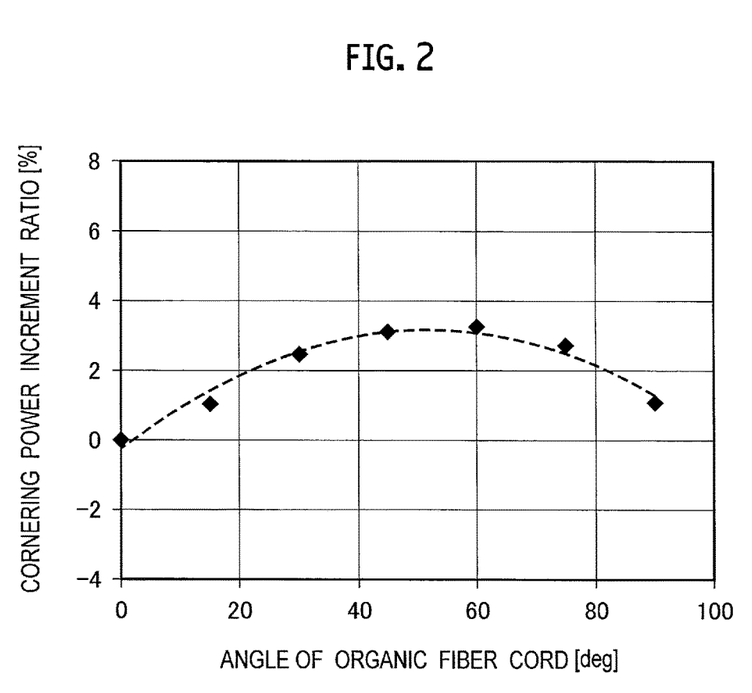
FIG. 2 is a diagram illustrating a relationship between an angle of an organic fiber reinforcing cord forming a reinforcing cord layer and cornering power.

The measurement result is shown in FIG. 2. According to the measurement result in FIG. 2, it is found that the angle of the organic fiber cord against the tire circumferential direction is preferable in a range of 20 degrees to 80 degrees.

Thirdly, the cornering power with respect to a sectional height of the reinforcing cord layer against the tire sectional height is evaluated. The tire according to the third evaluation is the same as the tire according to the first evaluation described above, and the test condition or the like of the third evaluation is similar to that of the first evaluation. An increasing rate of the corner power of the tire when the length of the reinforcing cord layer in the tire radial direction is changed between 20 mm and 60 mm is measured, as the reference is defined by the cornering power of a tire without the reinforcing cord layer.

Fourthly, the rolling resistance with respect to a ratio of the sectional height of the reinforcing cord layer against the tire sectional height is evaluated. The tire according to the fourth evaluation is the same as the tire according to the first evaluation described above, and the test condition or the like of the fourth evaluation is similar to that of the first evaluation. An increasing and decreasing rate of the rolling resistance of the tire when the sectional height of the reinforcing cord layer against the tire sectional length is changed is measured, as the reference is defined by the rolling resistance of a tire without the reinforcing cord layer.

Figure 3:
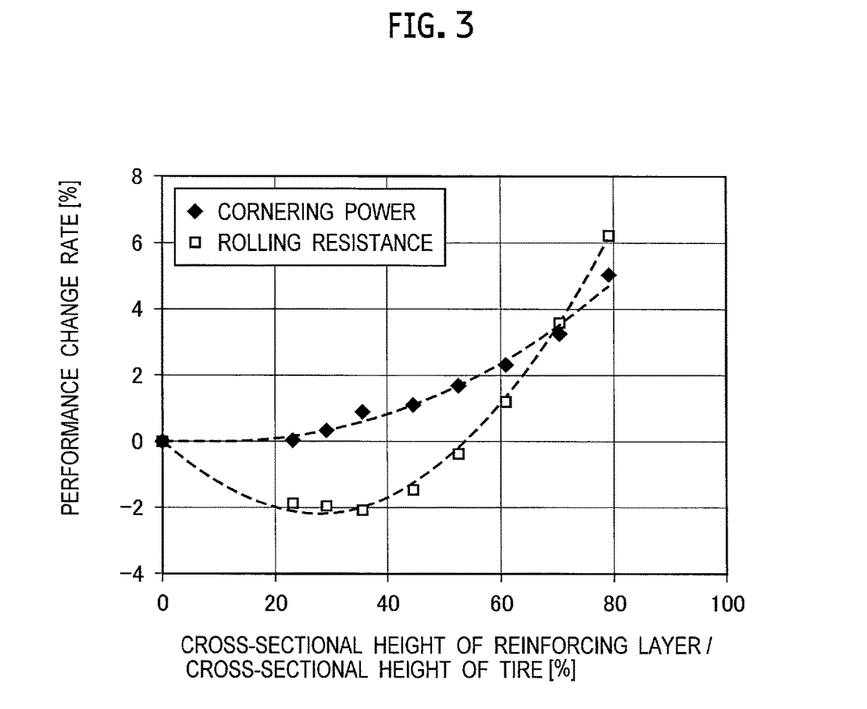
FIG. 3 is a diagram illustrating a relationship between a ratio of a sectional height of the reinforcing cord layer against a tire sectional height and a tire performance changing rate.

The measurement results of the third evaluation and the fourth evaluation are shown in FIG. 3.

According to the measurement result in FIG. 3, it is found that the cornering power is increased when the ratio of the sectional height of the reinforcing cord layer against the tire sectional height is more than 20%. Furthermore, it is found that the rolling resistance is decreased when the ratio of the sectional height of the reinforcing cord layer against the tire sectional height is less than 50%. Especially, it is considered that in a case in which the ratio of the sectional height of the reinforcing cord layer against the tire sectional height is in a range of 20% to 50%, since the deformation of the bead filler or the like is suppressed, the rolling resistance is decreased. On the other hand, it is considered that in a case in which the ratio of the sectional height of the reinforcing cord layer against the tire sectional height is more than 50%, since the tread part is deformed easily, the rolling resistance is deteriorated.

It should be noted that the present application claims priority to Japanese Patent Application No. 2014-081160, filed on Apr. 10, 2014, the entire contents of which are incorporated by reference herein.

INDUSTRIAL APPLICABILITY

The present invention provides a tire that can reduce Tight of the tire and improve operation stability in turning by enhancing rigidity of a bead part in a lateral direction.

REFERENCE SIGNS LIST

1 TIRE
2 BEAD PART
3 CARCASS LAYER
4 SIDEWALL PART
5 TREAD PART
6 BELT LAYER
9 REINFORCING CORD LAYER
21 BEAD CORE
22 BEAD FILLER
31 BODY PLY

32 FOLDED PLY
91 INNER SIDE REINFORCING CORD LAYER
92 OUTER SIDE REINFORCING CORD LAYER

The invention claimed is:

1. A tire in which a mounting direction to a vehicle is designated, the tire comprising:
   a tread part configured to be in contact with a road surface;
   a pair of bead parts including a bead core and a bead filler;
   a carcass layer folded around the bead core and extended toroidally between the pair of bead parts; and
   a reinforcing cord layer having a cord configured to reinforce the pair of bead part, wherein
   in a vehicle inner side bead part, a number of layers in the reinforcing cord layer is larger on an inner side in a tire width direction with respect to the bead filler than on an outer side in the tire width direction with respect to the bead filler,
   in a vehicle outer side bead part, a number of layers in the reinforcing cord layer is larger on the outer side in the tire width direction with respect to the bead filler than on the inner side in the tire width direction with respect to the bead filler, and
   a density of the cord in the reinforcing cord layer in the vehicle outer side bead part is larger than a density of the cord in the reinforcing cord layer in the vehicle inner side bead part.

2. The tire according to claim 1, wherein the vehicle inner side bead part has the reinforcing cord layer only at the inner side in the tire width direction with respect to the bead filler, and the vehicle outer side bead part has the reinforcing cord layer only at the outer side in the tire width direction with respect to the bead filler.

3. The tire according to claim 1, wherein an angle of the cord against a tire circumferential direction is in a range of 20 degrees to 80 degrees.

4. The tire according to claim 1, wherein a tire radial direction outer end part of the reinforcing cord layer is arranged in a range of 20% to 50% of a tire sectional height from a bottom surface of the bead part toward the outer side in a tire radial direction.

5. The tire according to claim 1, wherein a length in the tire radial direction of the reinforcing cord layer in the vehicle outer side bead part is the same as a length in the tire radial direction of the reinforcing cord layer in the vehicle inner side bead part.

6. The tire according to claim 1, wherein a length in the tire radial direction of the reinforcing cord layer in the vehicle outer side bead part is longer than a length in the tire radial direction of the reinforcing cord layer in the vehicle inner side bead part.

7. The tire according to claim 6, wherein the tire radial direction outer end part of the reinforcing cord layer in the vehicle outer side bead part is arranged in a range of 20% to 50% of a tire sectional height from a bottom surface of the bead part toward the outer side in the tire radial direction, and
   the tire radial direction outer end part of the reinforcing cord layer in the vehicle inner side bead part is arranged in a range of 15% to 40% of the tire sectional height from the bottom surface of the bead part toward the outer side in the tire radial direction.

* * * * *